(No Model.)
H. A. BARNARD.
CLUTCH MECHANISM FOR FLOUR PACKERS.
No. 462,192. Patented Oct. 27, 1891.
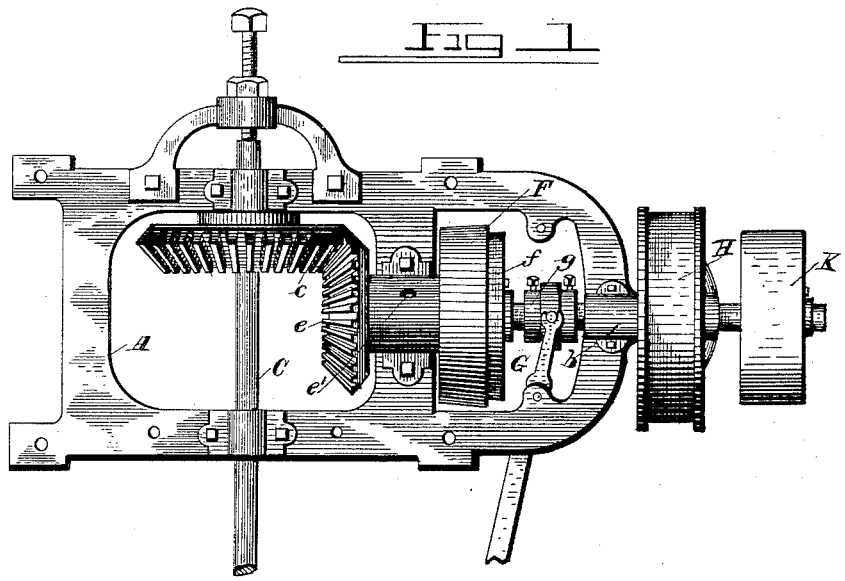
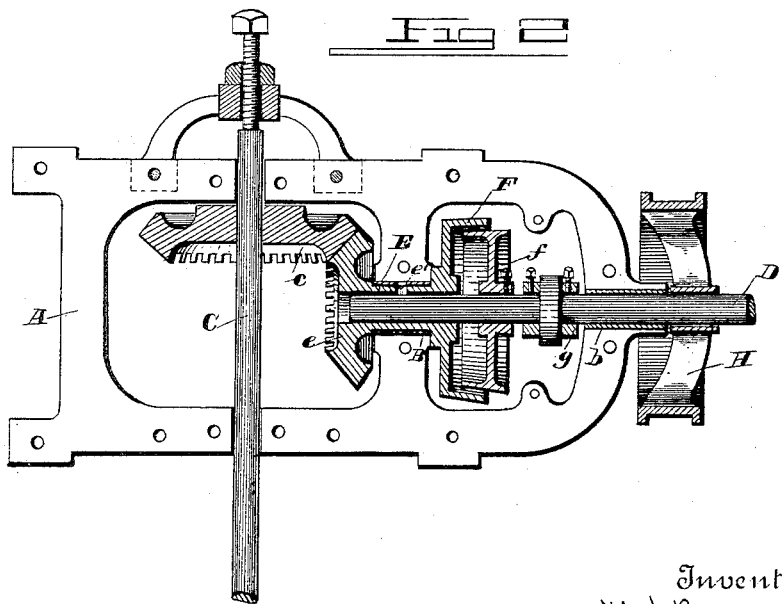
Witnesses
C. W. Seville
Jas. L. Mausfield
Inventor
H. A. Barnard
By his Attorney J. H. Alexander

UNITED STATES PATENT OFFICE.

HEMAN A. BARNARD, OF MOLINE, ILLINOIS, ASSIGNOR TO THE BARNARD & LEAS MANUFACTURING COMPANY, OF SAME PLACE.

CLUTCH MECHANISM FOR FLOUR-PACKERS.

SPECIFICATION forming part of Letters Patent No. 462,192, dated October 27, 1891.

Application filed June 17, 1891. Serial No. 396,579. (No model.)

*To all whom it may concern:*

Be it known that I, HEMAN A. BARNARD, of Moline, in the county of Rock Island and State of Illinois, have invented certain new and useful Improvements in Clutch Mechanisms for Flour-Packers; and I do hereby declare that the following is a full, clear, and exact description thereof, reference being had to the accompanying drawings, and to the letters of reference marked thereon, which form part of this specification, in which—

Figure 1 is a side elevation of the upper portion or driving mechanism of a flour-packing machine, showing my improved clutch operating or driving mechanism. Fig. 2 is a detail vertical longitudinal central section through Fig. 1, omitting the driving-pulley.

This invention is an improvement in the drive or clutch devices for flour-packing machines, wherein the auger or vertical packing-shaft is driven by gearing from a horizontal shaft; and its object is to provide a drive in which the driving-shaft will always be in a line exactly at right angles to the upright auger-shaft and the bearings, all in the packer or same frame, so that the settling of the packer by the weight of flour in the bin overhead will not affect the relative alignments of the shafts.

The invention is an improvement upon the drive shown in my flour-packer, Patent No. 398,999, dated March 5, 1889; and it consists in the novel construction and combination of parts in the drive, as will be hereinafter fully described, and concisely summarized in the claims. Ordinarily the inner end of the driving-shaft has been supported in a bearing on the packer-frame, and its outer end in a bearing or hanger suspended from the floor above or other independent support, and when a friction-drive is used, as in my patent referred to, this driving-shaft is in two parts, connected by a friction-coupling. Now the unequal settling of the floor overhead or of that on which the packer stood caused the driving-shaft to get out of alignment, and when all in one piece, with the gear on the inner end, it caused the gear to mesh out of pitch-line with the gear on the auger-shaft, or when in two parts coupled by a friction-clutch it caused the two parts of the coupling to get out of line with each other and they would not properly transmit the power required to drive the packer.

In the drawings, A designates a metal frame, in which the bearings for the auger-shaft C and the driving-shaft D are partly formed, the shafts being held in the bearings by journal-box caps. The frame is constructed like that shown and described in my aforesaid patent, and the arrangement of auger and driving shafts and their connections are similar; but the mechanical construction of the driving-shaft and connections is different.

In my invention I mount the bevel-gear $e$ of the drive, which meshes with bevel-gear $c$ on the shaft C, on the inner end of a revoluble sleeve E, which is journaled in the inner bearing B of the driving-shaft, and on the other end of said sleeve I rigidly mount the outer disk F of a friction-coupling. In practice I propose to cast gear $e$, sleeve E, and disk F in one piece. The driving-shaft D is short, its inner end is journaled and supported in the bore of sleeve E and its outer end is supported in a journal-bearing $b$ on the end of frame A, and the other disk $f$ of the friction-coupling is keyed on shaft D between the bearing $b$ and sleeve E, and a collar $g$ is fixed thereon and engaged by a bifurcated lever G, pivoted on frame A, and by which shaft D can be longitudinally shifted, so as to throw the clutch-disks into or out of engagement.

H is a pulley fixed on the shaft D, by which the small lower shaft (not shown) of the packer can be driven. The driving-pulley K for shaft D is keyed thereon exterior to the pulley H. The shaft is free to revolve in the bearing $b$ and E, and will only revolve gear $e$ when the clutch-disks are in engagement. The sleeve E has a hole $e'$ in it to allow oil to penetrate to shaft F.

By the construction described I gain a double bearing for the driving-shaft entirely within the frame without connecting it to any outside bearing. Power can be applied to the driving-shaft without the employment of such bearing. The shafts will be always kept in line, no matter how much the packer may settle, and the two faces of the friction-clutch couplings will always fit snugly and truly and the gears mesh in the true-pitch line.

Having thus described my said invention, I claim—

1. The combination of the frame, the revoluble sleeve journaled therein, having a gear on one end and a part coupling on the other, and a longitudinally-movable driving-shaft having one journal in the frame and the other in said sleeve, and the one-part coupling on said shaft adapted to interlock the part coupling on the sleeve when the shaft is longitudinally shifted in the proper direction, all substantially as specified.

2. The combination of the frame having a pair of vertical and a pair of horizontal journal-bearings, the auger-shaft journaled in the vertical bearings, the revoluble sleeve journaled in the inner horizontal bearing, and the gearing between said sleeve and auger-shaft, with the longitudinally-movable driving-shaft having one end journaled in the outer horizontal bearing and its other end journaled in the sleeve, the coupling devices on said shaft and sleeve adapted to interlock them when the shaft is moved inward, and the devices for shifting said shaft, all substantially as specified.

3. The combination of the journaled revoluble sleeve having a gear on one end and a disk on its other end, and a vertical driven shaft geared to said sleeve, with a longitudinally-movable driving-shaft having its inner end journaled in said sleeve, the friction-disk on said shaft adapted to engage the disk on the sleeve, and means for shifting said shaft and for driving it, all substantially as described.

4. The combination of the frame having a pair of vertical and a pair of horizontal journal-bearings, the auger-shaft journaled in the vertical bearings, the revoluble sleeve journaled in the inner horizontal bearing, the gear on the end of said sleeve meshing with a bevel-gear on the auger-shaft, and a friction-disk on the other end of said sleeve, with a longitudinally-movable driving-shaft having one end journaled in the outer bearing and its other end journaled in the sleeve, and the friction-disk and drive-pulley on said shaft, and means for longitudinally shifting it, substantially as set forth.

In testimony that I claim the foregoing as my own I affix my signature in presence of two witnesses.

HEMAN A. BARNARD.

Witnesses:
J. S. LEAS,
C. A. BARNARD.